(12) United States Patent
Martin

(10) Patent No.: US 7,783,156 B2
(45) Date of Patent: Aug. 24, 2010

(54) METHOD AND SYSTEM FOR READING INFORMATION RECORDED IN AN AUDIO-VISUAL APPARATUS

(75) Inventor: Jérôme Martin, Paris (FR)

(73) Assignee: Thomson Licensing, Boulogne Billancourt (FR)

( * ) Notice: Subject to any disclaimer, the term of this patent is extended or adjusted under 35 U.S.C. 154(b) by 1551 days.

(21) Appl. No.: 10/507,673

(22) PCT Filed: Mar. 17, 2003

(86) PCT No.: PCT/FR03/00836

§ 371 (c)(1),
(2), (4) Date: Sep. 14, 2004

(87) PCT Pub. No.: WO03/079679

PCT Pub. Date: Sep. 25, 2003

(65) Prior Publication Data

US 2005/0105882 A1 May 19, 2005

(30) Foreign Application Priority Data

Mar. 15, 2002 (FR) .................................. 02 03197

(51) Int. Cl.
*H04N 5/76* (2006.01)
*H04N 7/26* (2006.01)

(52) U.S. Cl. ........................................ 386/83; 386/109
(58) Field of Classification Search ...................... 386/1, 386/45–46, 83, 95, 109, 112, 125–126
See application file for complete search history.

(56) References Cited

U.S. PATENT DOCUMENTS

| 5,623,588 | A | 4/1997 | Gould |
| 5,974,015 | A | 10/1999 | Iizuka et al. |
| 5,999,688 | A | 12/1999 | Iggulden et al. |
| 6,188,831 | B1 | 2/2001 | Ichimura |
| 6,868,225 | B1* | 3/2005 | Brown et al. ................... 386/83 |
| 7,082,257 | B2* | 7/2006 | Yamauchi et al. .............. 386/95 |

OTHER PUBLICATIONS

Searcha Report Dated Aug. 1, 2003.

* cited by examiner

*Primary Examiner*—Thai Tran
*Assistant Examiner*—Nigar Chowdhury
(74) *Attorney, Agent, or Firm*—Robert D. Shedd; Joseph J. Opalach; Reitseng Lin

(57) ABSTRACT

This invention relates on a method and a system for reading a set of recorded information that is applicable to a reading system making it possible to read sequential information. In a first step, the user marks a first information sequence currently being read triggered by a first interrupt by actuating a device for triggering a special processing mode. This special mode can be trigger by a fast movement key, this mode allows reading a second information sequence. In a second step, the user can rewind to the first information sequence interrupted and marked during the previous marking step. This rewind step is triggered during the reproduction of the second sequence when the user actuates a rewind device. The invention is applicable to the reproduction by a user of recorded information and more particularly to the displaying of an audiovisual work.

19 Claims, 5 Drawing Sheets

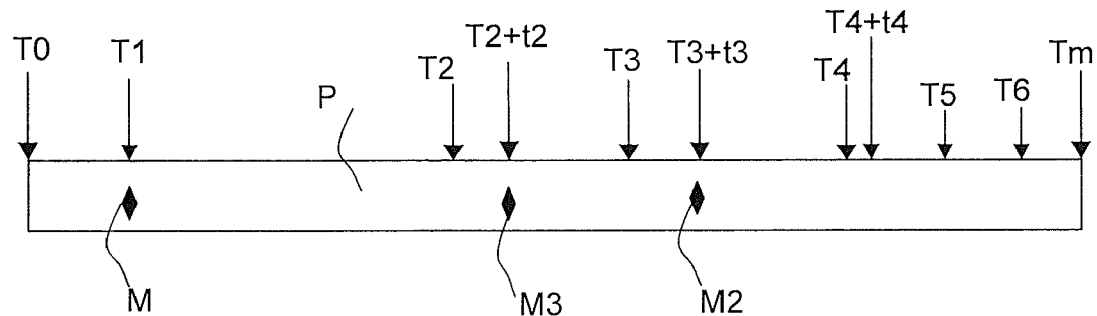
Fig. 2b
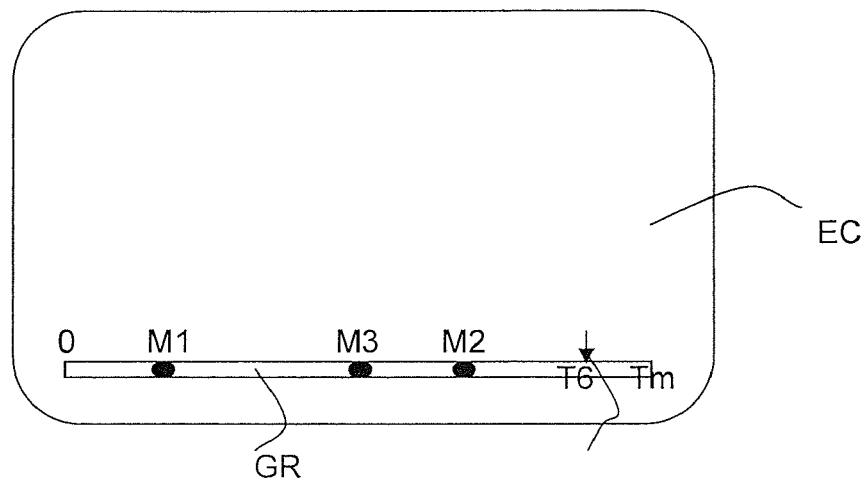
Fig. 2c
Fig. 3a

METHOD AND SYSTEM FOR READING
INFORMATION RECORDED IN AN
AUDIO-VISUAL APPARATUS

This application claims the benefit, under 35 U.S.C. §365 of International Application PCT/FR03/00836, filed Mar. 17, 2003, which was published in accordance with PCT Article 21(2) on Sep. 25, 2003 in French and which claims the benefit of French patent application No. 0203197, filed Mar. 15, 2002.

FIELD OF THE INVENTION

The present invention relates to a method and a system for reading information recorded in an audiovisual apparatus.

BACKGROUND

The invention is applicable especially in systems where an information set such as an audiovisual program is made available to a user either because it has been recorded on a recording medium and it is readable by a reader such as a video recorder, a DVD (digital versatile disk) reader, a CD reader, a hard disk reader or because it is made available to the user by a remote server.

The invention is applicable especially to systems making it possible to read successively, in series, the information of a recording.

To facilitate the description, the invention will be described herein below within the framework of the displaying of an audiovisual program. The invention is, however, applicable to the reproduction by the user (reading, listening, etc.) of any other type of information ordinarily presented sequentially.

When he views an audiovisual program, a user may feel the need to skip certain sequences or rewind to an earlier sequence, or to search for a particular sequence in the recording. For this, on commercial readers (DVD readers, CD reader, video recorder, etc.) he is furnished with fast rewind and fast forward keys, with fast forward read and fast reverse read and with slow-motion keys. In the subsequent description, these keys will be designated, in a general manner, by the term "device for triggering a mode of special processing".

However, when he leaves a first viewing sequence, so as to view or search for a second sequence, the user has difficulties in returning to the first sequence unless he notes down the address of the first sequence when he leaves it so as to return to it later manually and still he does not always return to it very accurately.

U.S. Pat. No. 5,999,688 teaches an apparatus for displaying recorded audiovisual program such as a video recorder. The user can mark the program by pointing the start and the end of advertising sequences. Once this marking phase has terminated, the user can navigate from one advertising sequence to another, the reading of a new sequence being performed at the start. This patent does not teach that it is possible to return to a sequence at the place that it was previously left.

U.S. Pat. No. 6,188,831 also teaches an apparatus for displaying audiovisual program recorded in a medium. The apparatus is furnished with means of pointing (an optical pen) making it possible to mark events of the program.

U.S. Pat. No. 5,623,588 teaches an IT apparatus displaying a chronological graphical representation of an event. This representation exhibits variations depending on whether the corresponding moment includes few or many elements. A marker makes it possible to place the current moment while displaying the event.

U.S. Pat. No. 5,974,015 discloses a means of digital recording of audio and/or video data. These data are chopped into packets before being recorded. None of these documents teaches the possibility of returning easily and accurately to a previous reading point.

The invention makes it possible to solve this difficulty.

SUMMARY OF THE INVENTION

The invention therefore relates to a method of reading a set of recorded information that is applicable to a reading system making it possible to read information, especially sequential information, and comprising at least one device for triggering a mode of special processing of the information to be read. This method comprises two steps:

marking a first information sequence currently being read triggered by a first interrupt when the user actuates said device for triggering a mode of special processing with a view to reading a second information sequence;

rewinding to the first information sequence interrupted and marked during the previous marking step, this rewind step being triggered by the user during the reproduction of the second sequence when the user actuates a rewind device.

This method is applicable to a system comprising several control devices or control keys arranged on a remote control or the front panel of the apparatus, and within this context, the rewind step can be controlled by any one of these control devices.

According to this method, after a first marking step, if the user again actuates said device for triggering a mode of special processing after a time of reading of the second sequence that is greater than a determined time, a second marking step is triggered and so on and so forth.

On the other hand, if the user again actuates said device for triggering a mode of special processing after a time of reading of the second sequence that is less than this determined time, the second marking step is not triggered.

When operating in this manner, the various successive markings are not erased so as to allow the user to return thereto later.

To be able to return to a sequence marked during an earlier displaying of the program recorded, there is provision for each information item to be assigned an address or indication for pinpointing this information item. Each marking step provides for the registering, in a temporary memory, of the address or of the pinpointing indication corresponding to an information sequence, this will make it possible to return to this sequence later. For this purpose, the rewind step comprises a phase of reading said memory. Thereafter, there is provided a phase for addressing the information sequence corresponding to a pinpointing indication read from the temporary memory.

One way of performing the marking and of organizing the rewind to a marked sequence is to number, in the temporary memory, the various pinpointing indications corresponding to various markings. Moreover, the rewind device which is typically a user interface, can include numbered keys. The actuation of a numbered key allows the reading of the pinpointing indication bearing the same number and then the step of rewind to the sequence situated at the locating indication read.

The method of the invention provides moreover for a step of graphical display to allow the user to himself manage the rewinds to these or those marked sequences. This graphical display comprises a representation of the duration or of the length of the set of information recorded as well as the displaying on this graphic of a tag pinpointing the location of each sequence marked. With each tag may possibly be associated a marking number.

The graphical display can be erased on completion of a timeout and be replaced with the display of a simplified indicator indicating that at least one marking is recorded. Then, the simplified indicator being displayed, a first actuation of the rewind device triggers the graphical display step and a second actuation triggers the rewind step to a marked sequence.

More simply, provision may be made for the display of a simple graphical information item indicating that at least one marking step has been triggered.

The invention also relates to a system for reading a set of recorded information making it possible to read information in series and comprising at least one device for triggering a mode of special processing of the information to be read capable of interrupting the normal reading of the information so as to move rapidly to another sequence of the recording, wherein it comprises a circuit for marking an interrupted sequence receiving a special mode signal and instructing in exchange the marking of the address of the sequence interrupted in a memory.

This system furthermore comprises at least one control device for instructing rewind to an interrupted sequence as well as a circuit for reading the memory instructing the reading of the interrupt address (Add1, Add2 . . . ) in said memory and instructing the rewind to the reading of the recording from this interrupt address.

The marking circuit makes it possible to instruct the registering in the memory of one or more interrupt addresses. It can also assign a serial number (M1, M2, M3 . . . ) to each interrupt address (Add1, Add2, Add3 . . . ). Moreover, the actuation of a numbered key can be used by the reading circuit (46) to instruct the reading from the memory of the address having the same serial number as the number of the numbered key actuated.

BRIEF DESCRIPTION OF THE DRAWINGS

The various objects and characteristics of the invention will become more clearly apparent in the description which follows given by way of non-limiting example and in the figures which represent:

FIGS. 2a to 2c, a more elaborate exemplary embodiment of the method according to the invention;

FIGS. 3a and 3b, examples of displays allowing the user to use the method according to the invention;

DETAILED DESCRIPTION

Figure 1A:
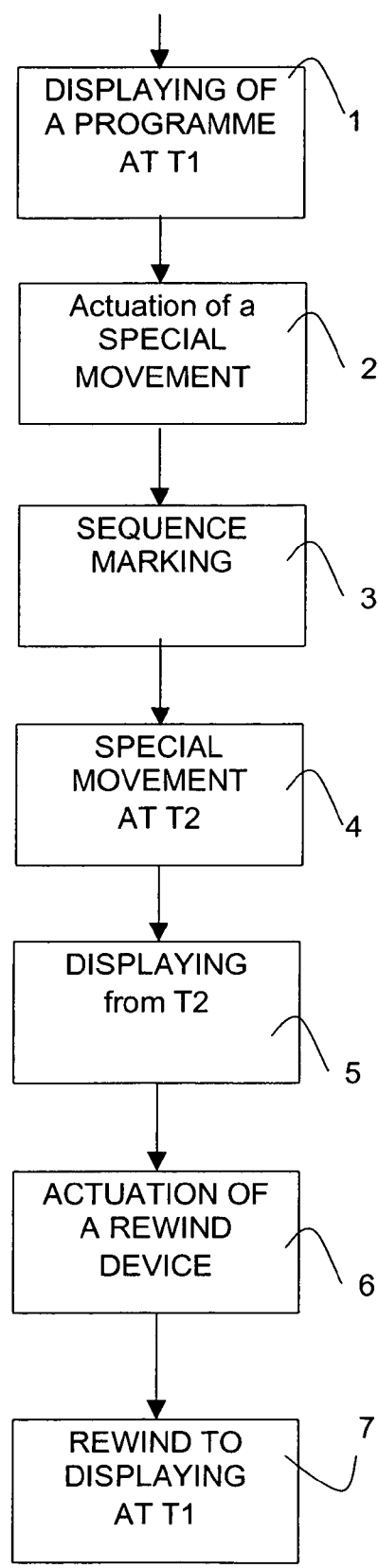
FIG. 1a, an operating diagram for an exemplary simplified embodiment of the method of reading information according to the invention.
Figure 1B:
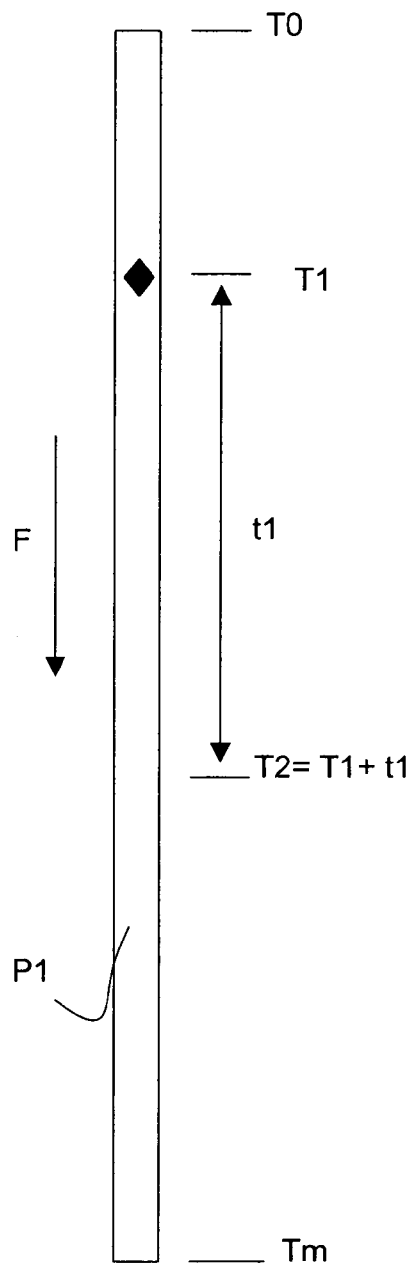
FIG. 1b, a recording illustrating the conduct of the method of FIG. 1b.

Referring to FIGS. 1a and 1b, an exemplary embodiment of the method according to the invention will therefore be described.

The invention is applicable to the reproduction by a user of recorded information. For the sake of clarity, the invention will be described in what follows by considering that the user is concerned with viewing a video program. This program is recorded on any recording medium such as a video cassette, DVD (digital versatile disk) disk, computer hard disk for example, or television decoder readable by an appropriate reader. It can also be recorded remotely, for example by receiving the program via a broadcast network, or downloading the program from a server via a point-to-point link. The user therefore has access to this program and can therefore view it on a display screen (TV screen). To control this displaying, he is furnished in a known manner with a remote control or with a keypad which controls the reading device. In a general manner, the user is furnished with keys making it possible to control the forward or reverse reading of the video program, with keys for controlling fast forward or forward or reverse slow motion of the system for reading the recording with a view to skipping to the reading of a different sequence. He is also furnished with keys for controlling fast or slow reading, forward or reverse, with a view to searching for sequences as well as with other diverse keys allowing particular operations. As mentioned previously, the fast forward or slow motion keys and the forward or reverse fast reading keys are designated in a general manner, in the present description by the term "device for triggering a mode of special processing".

FIG. 1b schematically represents a recording, for example a video program which commences at a moment T0 and terminates at a moment Tm. The recording is therefore read normally in the direction indicated by the arrow F. When the program recorded is constituted by chapter, as is currently the case in a DVD, an improvement consists in displaying only a representation of the current chapter or of several chapters including the current one. This improvement is particularly useful when the program is marked at numerous places and if it is difficult to distinguish them when they are too close together in time.

It is assumed that the user is displaying the recording and that he is at a display tag corresponding to the moment T1 of the recording with respect to the moments T0 and Tm. In the diagram of FIG. 1a, we are therefore at step 1 situated at the top of the flowchart ("DISPLAY A PROGRAM AT T1").

While he is viewing the program, the user actuates a special processing mode triggering device. For example, he wishes to obtain a fast movement to another zone of the recording, but this might be another mode such as fast read or slow motion. He thus carries out step 2 of the flowchart labeled "Actuate a SPECIAL MOVEMENT". According to the exemplary embodiment described, in step 3 labeled "SEQUENCE MARKING", a marking of the recording is performed at the moment T1 with a view to later use.

In step 4 ("SPECIAL MOVEMENT AT T2"), the system instructs the execution of the special movement. For example, it instructs a fast forward and stops this fast forward at the moment T2=T1+t1. The user then again views the recording according to the normal mode of display, but this time from the moment T2. This is labeled in step 5 of the flowchart ("DISPLAY from T2").

If, in the course of the displaying of the recorded program, the user actuates the rewind device, then the program skips to step 6 labeled "ACTUATE A REWIND DEVICE". Then, the method of FIG. 1a provides for step 7 ("REWIND TO DISPLAY AT T1"), the rewind of the system to the previously marked recording tag and therefore the rewind to the moment T1. It should be noted that this rewind device may be a particular key or, according to a variant, any key of the remote control or of the keypad of the user, or else the selection of an icon appearing on the screen.

Figure 2A:
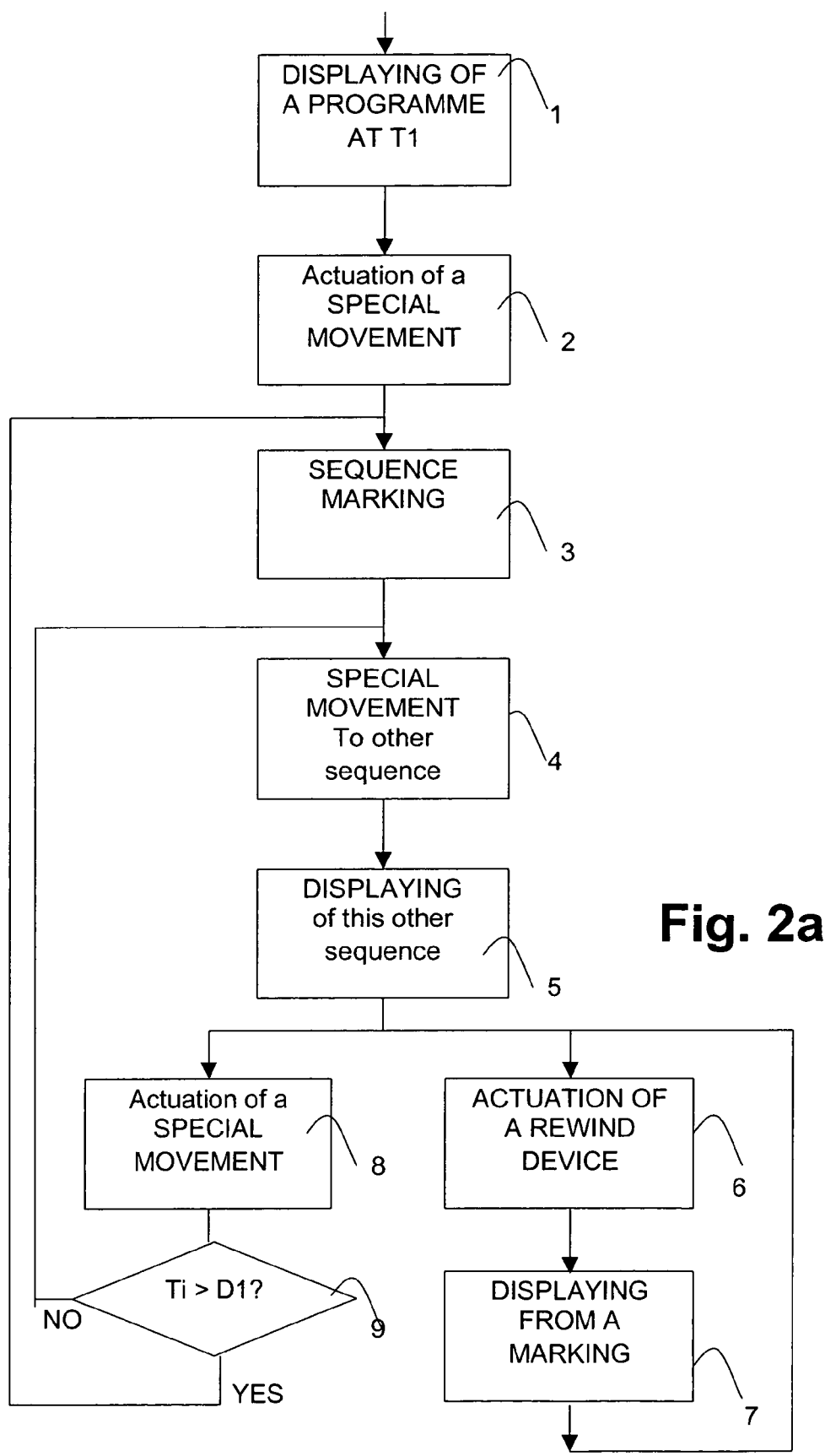

Referring to FIGS. 2a to 2c, a more improved exemplary embodiment of the method of the invention will be described.

FIG. 2b represents a recording P1 which commences at the moment T0 and which terminates at the moment Tm. The user views the recording. At the moment T1, he wishes to perform a fast forward and to undertake various searches in the recording. The method represented in FIG. 2a will manage the operation of the system in such a way that the user can retrieve the various tags of the recording through which it has passed. For this purpose we shall refer to the flowchart of FIG. 2a.

During step 1, the user displays a programme contained in the recording P1 doing so up to the moment T1 ("DISPLAY A PROGRAM AT T1").

At the moment T1, the user actuates a special processing mode triggering device (step 2).

In the course of step 3, indicated "SEQUENCE MARKING", a mark M1 is made at the moment T1 of the recording.

In the course of step 4, the system instructs the special movement to another sequence of the recording, for example, up to the tag of the recording situated at the moment T3.

In the course of step 5, the user views the recording from the moment T3 for a duration t3.

As before, in the course of the displaying of the recorded program, the user can actuate the rewind device, so the program skips to step 6 labeled "ACTUATION OF A REWIND DEVICE", and to step 7 for displaying the sequence from the marking. The program continues by looping around the two steps 6 and 7.

Let us now assume that, at the moment T3+t3, the user actuates a special processing mode triggering device (step 8), for example a fast rewind key.

In the course of step 9, the duration t3 is compared with a value predetermined in advance D1.

If the duration t3 is greater than D1, according to the present exemplary embodiment, we rewind to step 3 and carry out the marking of the sequence just interrupted. A mark M2 is therefore made at the moment T3+t3 of the recording. Thereafter, the special movement instructed by the user is performed. For example, as is represented in FIG. 2b, a fast rewind is performed up to the moment T2.

If the duration t3 is less than D1, according to the present exemplary embodiment, we go directly to step 4 and the fast movement instructed by the user is performed without performing the marking at the moment T3+t3 of the recording.

In FIG. 2b, it has been assumed that t3 is greater than D1. The fast rewind T2 is executed and a mark is made at the moment T3+t3 of the recording. At the moment T2, the user displays the recording in the normal mode of display (step 5) up to the moment T2+t2. At this moment, the user again actuates a special processing mode triggering device. It is assumed that t2 is greater than D1. The same manner of operation as previously re-occurs by passing through steps 9, 3 and 4. The tag situated at the moment T2+t2 of the recording is therefore marked by a marking M3 and the special movement is performed. According to the example of FIG. 2b, this special movement is a fast forward up to the moment T4. The user then again actuates a special processing mode triggering device at a moment T4+t4 such that t4 is less than D1. Under these conditions, the recording is not marked at the moment T4+t4 and step 4 is carried out directly. For example, a fast forward is instructed up to the moment T5 of the recording (step 4). The user displays the recording in the normal mode of display from T5 (step 5), then at the moment T6 he actuates the rewind device to rewind to a marked sequence (step 6). For example, the rewind is made to the sequence marked last of the recording, that is to say to the mark M3.

Operation continues thereafter. Such operation can be interrupted as described previously either by the actuation of a special processing mode triggering device (step 8), or by the actuation of a rewind device for rewinding to the sequence most recently marked (step 6).

The rewind device can consist of any key of the keypad of the remote control or of the front panel of the apparatus. However, this device is different from that intended for triggering the special processing mode, the latter device may be a different key.

In a general manner, it is therefore seen that the invention allows automatic marking of a program recorded when the user actuates a special processing mode triggering device in such a way as to allow him to return likewise automatically to a sequence thus marked when he actuates a rewind device.

According to an improvement of the invention, the numbered keys and especially, in a remote control of a video reader, the keys for selecting television stations are used as rewind devices. The invention then makes provision for the actuation of a numbered key to make it possible to designate the mark bearing the same number. For example, in the example of FIG. 2b, when the displaying is at T6, the actuation of key number 1 makes it possible to rewind directly to the location of the recording marked M1. This makes it possible for the user to avoid, when he is at T6, passing back through the locations marked M3 and then M2 to rewind to M1.

To implement this arrangement, there is provided, according to an exemplary embodiment, in the sequence marking step (step 3), a phase of recording, in a temporary memory, of the indication of position of each sequence interrupted and hence of the moment of the interrupt (T1, T2, . . . Tn) and to associate a marking serial number with each of these indications. Thus, FIG. 2c represents such a memory. The various moments T1, T3+t3, T2+t2 have been recorded and marking serial numbers M1, M2, M3 have been assigned to them respectively. Thereafter, during the actuation of a rewind device (step 6), the "DISPLAYING FROM A MARKING" step (step 7) will comprise a phase of reading the temporary memory. In the case where the numbered keys are not specialized in this manner of operation, then the last marking recorded will preferably be read so as to get the rewind address in the recording. In the case where the rewind keys must allow rewind to a determined mark, the number of the key actuated will allow direct access to the corresponding marking serial number and thus to the corresponding location in the recording.

The method of the invention makes provision, according to a variant, for the displaying on a display screen, which may be quite simply the television screen in the case where the recording is an audiovisual program, of a graphical representation illustrating the length or the duration of the recording. On this graphic, there is provision, during each marking step (step 3), to display a tag representing the marking carried out. Likewise there is provision to display a moveable tag representing the location of the recording currently being read.

FIG. 3a represents such a graphical representation. On the display screen EC, there is provision to display an element GR representative of the duration of the recording. The element has a linear form in FIG. 3a, but it could have any other form (an open annulus for example). At the two ends of the element GR are indicated the start and end moments of the recording, for example T0 and Tm.

The various markings M1, M2, M3 carried out on the recording of FIG. 2b have been depicted on this graphical representation. Above each marking is indicated its marking serial number (M1, M2, M3). Finally, a moveable arrow fm moves in tandem with the scrolling of the recording. For example, in FIG. 3a, the reading of the recording has reached the moment T6.

Figure 3B:
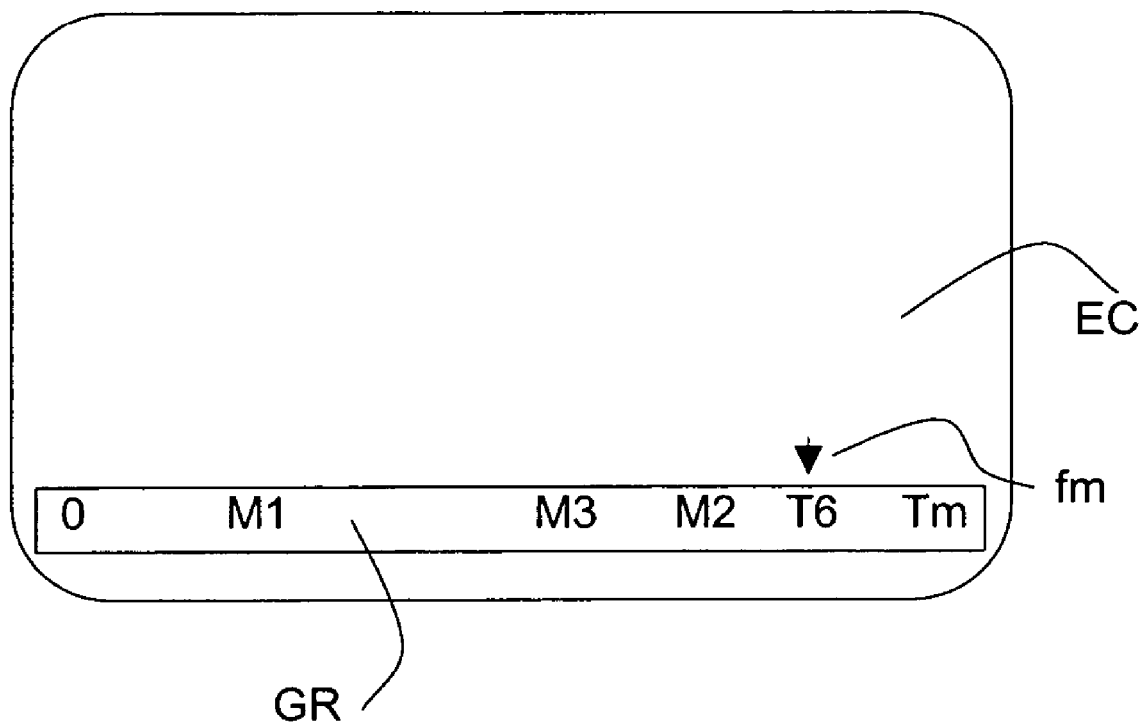

FIG. 3b represents a variant according to which the position of the numbers of the marks visually pinpoints the moment of the marks in the course of the program recorded. The start and end moments of the recording (T0 and Tm), the numbers of the marks M1, M2, M3, as well as the current moment of reading of the recording mark are registered in the graphic.

Thus, during step 6 (ACTUATION OF A REWIND DEVICE), the user will be able to choose the sequence of the recording from which he wishes to resume display.

The graphical representation thus displayed can represent an inconvenience to the user. The method of the invention therefore provides that, on expiry of a timeout, this graphical representation is no longer displayed on the screen. It may be replaced with a tag of reduced dimension reminding the user that markings have been carried out. In this case, there is provision for a first actuation of a rewind device to trigger the display of the graphic representation and a second actuation to trigger the rewind (step 6).

According to a simplified variant, it is also possible not to display any graphical representation, but merely to display a tag such as an icon indicating to the user that markings have been placed in memory in the apparatus.

A preferred embodiment consists in erasing the marks placed in memory when stopping the reading apparatus or when changing recording. A variant consists in prompting erasure from a menu.

Figure 4:
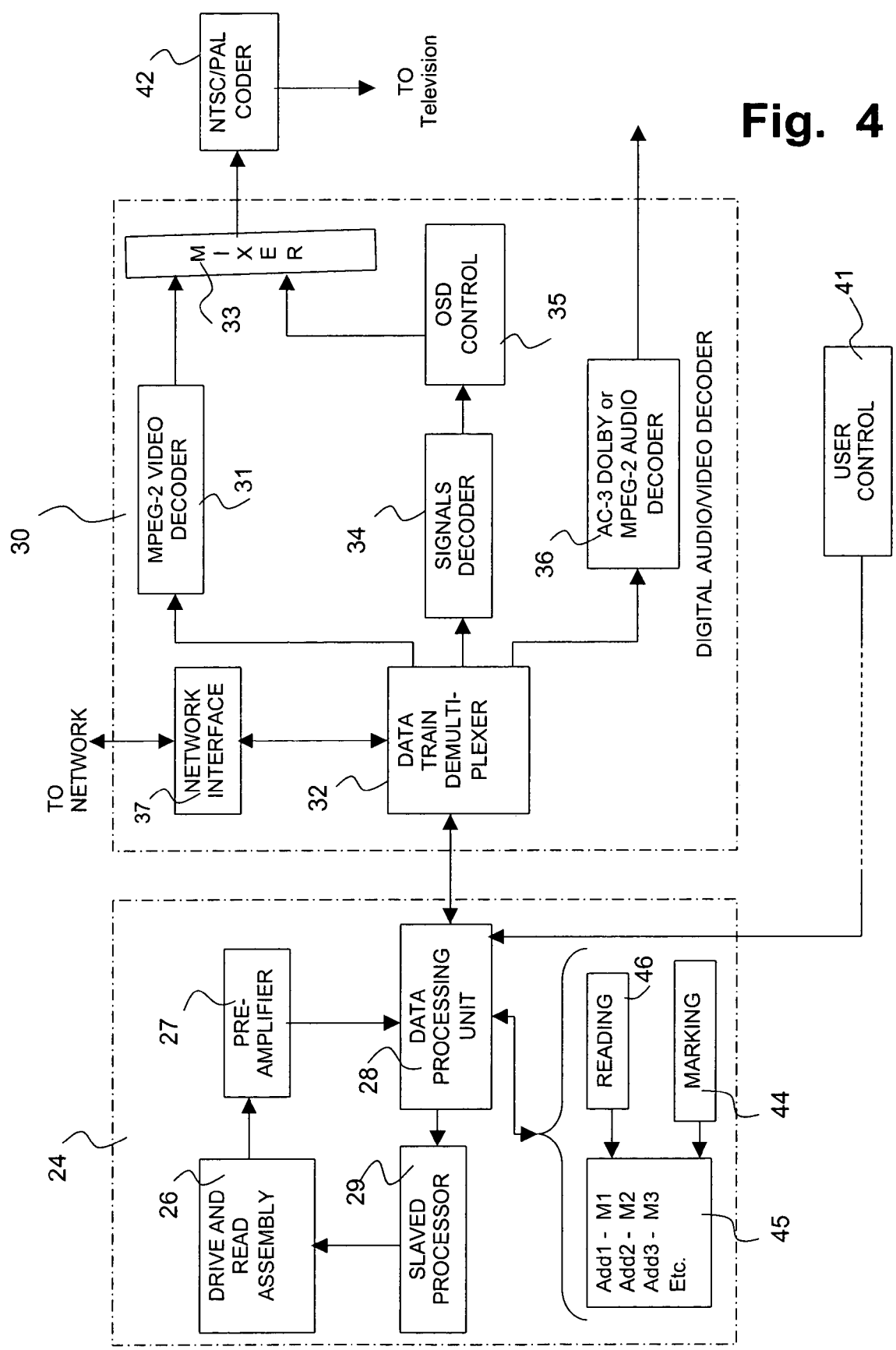
FIG. 4, an exemplary block diagram of a system making it possible to implement the method of the invention.

FIG. 4 represents an exemplary block diagram of a system implementing an exemplary embodiment of the method of the invention, applied by way of example to a digital video disk reader.

Although the exemplary embodiment is described with reference to a digital video device adapted for reading compressed video and audio data originating from a disk and for processing the data in accordance with the DVD specification, it will be understood that the present invention can be used in any video reading device in which position information is associated with the data to be read or with data packets to be read so that the reading device can rapidly pinpoint a data item or a particular block of data and commence reading from a selected location.

FIG. 4 is a schematic showing the basic elements of an exemplary digital video disk reader. The construction and the operation of these elements are known to the person skilled in the art and will not be dealt with in detail here. A disk reader 24 comprises a drive and read assembly 26 which, under the control of a slaved processor 29, rotates the disk and reads the information stored on it. A preamplifier 27 and a DVD data processing unit 28 translate the electrical pulses originating from the drive and read assembly 26 into digital data which can be processed by a digital audio/video decoder unit 30. The data processing unit 28 carries out functions such as demodulation, error correction and descrambling of the raw data read from the disk so that the data are in a format suitable for the decoder unit 30.

The decoder unit 30 receives the demodulated, descrambled and error-corrected data, processes the data and supplies the appropriate video and audio signals to a display unit, such as a television set. The decoder unit 30 comprises a data train demultiplexer 32 which demultiplexes the data originating from the data processing unit 28 into a plurality of separate data trains, comprising a video train, an audio train and a special signals train, and supplies the data trains to their respective data decoders. A video decoder 31 receives the video train and supplies a video signal to a mixer 33. A sub-images decoder 34 receives the sub-images train and supplies the data to an on-screen display (OSD) control 35 which supplies OSD video signals to the mixer 33. The combined video signal originating from the mixer 33 is supplied to an NTSC/PAL coder 42 which supplies a video display device with a video signal which complies with the appropriate standard for video signals. An audio decoder 36 receives the audio trains from the data train demultiplexer 32 and supplies the appropriate audio signals to an audio system.

The data processing unit 28 controls the operation of the disk reader 24. Said unit is coupled to a user control device 41, which can comprise infrared remote control devices, reader front panel buttons or the like, and translates the data originating from the user control device 41 so as to control the operation of the above described various elements of the disk reader 24. The data processing unit 28 can comprise a memory or be coupled to a memory to store various tables that determine the sequence of presentation of the data extracted from a disk. In a characteristic manner, the data processing unit 28 is also configured to control various access characteristics of the disk reader 24. The data processing unit 28 can be implemented in various forms, including, but without being limited thereto, a dedicated integrated circuit or a part of a decoder/controller unit. The data processing unit 28 can be composed of a unit or of a plurality of suitable controller units. Within the framework of the exemplary embodiments described above, there is provided a memory 45 serving in particular to store the read interrupt addresses, as will be made explicit herein below. This memory may be in the processing unit 28.

Within the framework of the exemplary embodiments described above, there is provided a memory 45 serving in particular to store the read interrupt addresses, as will be made explicit hereinbelow. This memory may be in the processing unit 28.

In the exemplary embodiment of FIG. 4, the user controls the reader with the aid of the control device 41 such as a remote control. It is known that a fast forward order, for example, emitted by the remote control is interpreted by the data processing unit 28 which controls the stopping of the display and, by way of the slaved processor 29, the fast forwarding of the disk reader unit. Upon this command, the data processing unit 28, with the aid of a marking circuit 44, instructs the registering of the interrupt and of the interrupt address (Add1 for example) in a memory. Possibly, in application of the method of FIG. 2a, it associates a marking serial number (M1 for example) with this address. It proceeds in this manner each time a special processing mode triggering device is actuated on the remote control. Thus, there may be several rewind addresses stored in memory 45, as is represented in FIG. 4.

When the user actuates a key of his remote control other than a special processing mode triggering device or than the "pause" or "stop" keys and preferably when he actuates a numbered key, the data processing unit 28, with the aid of the reading circuit 46, recognizes that it must instruct a rewind to a disk address marked previously in memory 45. It instructs the reading of a previously stored address and transmits it to the slaved processor 29 so that the latter instructs the reader 24 to go and read the disk at the address supplied by the data processing unit 28. Within the context of the application of the method of FIG. 2a, the maneuvering of a numbered key allows the reading circuit 46 to instruct the reading into memory 45 of the address whose serial number (M1, M2, M3 . . . ) is the same number as the key actuated.

Finally, the interrupt addresses or rewind addresses as well as their associated serial numbers may be erased under the control of the processing unit when the user instructs the stopping of the reader or changes the disk. Of course, a particular function key may be provided on the remote control to erase this information in memory.

The invention claimed is:

1. A method of reading an audiovisual program in a reading device, comprising:
   reading the audiovisual program;
   interrupting the reading of the audiovisual program when at a first point in the audiovisual program a user actuates a command for reading the audiovisual program starting at a second point thereof;
   marking the first point of the audiovisual program;
   reading the audiovisual program starting at the second point in the audiovisual program;
   interrupting the reading of the audiovisual program when at a third point in the audiovisual program, the user actuates a further command;
   comparing a time interval between the third and second points to a predetermined time; and
   marking the third point of the audiovisual program if the time interval between the third and second points is greater than the predetermined time, and not marking the third point of the audiovisual program if the time interval between the third and second points is not greater than the predetermined time.

2. The method of claim 1, wherein the user actuates commands using at least one user control device having at least one control key.

3. The method of claim 1, wherein a previous marking is not erased by a subsequent marking.

4. The method of claim 1, wherein each point of the audiovisual program is associated with an address, the method comprising registering the address associated with each marked point in a memory.

5. The method of 4, comprising:
   reading an address registered in the memory; and
   moving to the point of the audiovisual program associated with the address read.

6. The method of claim 5, wherein each marked point is associated with a numbered key of a user control device, and wherein the address read is the address registered in the memory for the marked point associated with the actuated numbered key.

7. The method of comprising providing a graphical display with a representation of a duration of the audiovisual program and a tag indicating a location in the audiovisual program of each marked point.

8. The method of claim 7, wherein with each tag is associated with a marking number.

9. The method of claim 7, wherein a timeout step is triggered on completion of a predetermined time after each marking step making it possible to interrupt the graphical display step.

10. The method of claim 9, wherein the timeout step triggers the display of an indicator indicating that at least one marking is recorded.

11. The method of claim 10, wherein the indicator being displayed, a first actuation of a user control device triggers the graphical display step and a second actuation triggers the moving step.

12. The method of comprising displaying a graphical information item indicating that at least one point has been marked.

13. The method of claim 1, wherein the further command is for reading the audiovisual program starting at a fourth point thereof, the method comprising moving to the fourth point of the audiovisual program.

14. The method of claim 13, wherein the first and fourth points are the same.

15. A system for reading an audiovisual program comprising:
   means for reading the audiovisual program;
   a user input device for interrupting the reading of the audiovisual program so as to move the reading of the audiovisual program to another point thereof;
   a marking circuit, the marking circuit:
      marking a first point of the audiovisual program upon actuation of the user input device to move to a second point of the audiovisual program,
      upon further actuation of the user input device at a third point in the audiovisual program, comparing a time interval between the third and second points to a predetermined time, and
      marking the third point of the audiovisual program if the time interval between the third and second points is greater than the predetermined time, and not marking the third point of the audiovisual program if the time interval between the third and second points is not greater than the predetermined time; and
   moving means for moving the reading of the audiovisual program.

16. The system of claim 15, wherein each point of the audiovisual program is associated with an address, the marking circuit registering the address associated with each marked point in a memory.

17. The system of claim 16, comprising a reading circuit for reading an address registered in the memory, wherein the moving means moves the reading of the audiovisual program to the point associated with the address read.

18. The system of claim 17, wherein each marked point is associated with a numbered key of the user input device, and wherein actuation of a numbered key causes the reading circuit to read the address registered in the memory for the marked point associated with the actuated numbered key.

19. The system of claim 18, wherein the marking circuit assigns a marking number to each address registered in the memory, the marking numbers corresponding to the numbered keys of the user input device.

* * * * *